United States Patent
Bharaj et al.

(10) Patent No.: US 12,462,813 B1
(45) Date of Patent: Nov. 4, 2025

(54) DATA-DRIVEN AUDIO DEEPFAKE DETECTION

(71) Applicant: Reality Defender, Inc., New York, NY (US)

(72) Inventors: Gaurav Bharaj, Los Angeles, CA (US); Petr Grinberg, Lausanne (CH); Ankur Kumar, Los Angeles, CA (US); Surya Koppisetti, Coquitlam (CA)

(73) Assignee: Reality Defender, Inc., New York, NY (US)

( * ) Notice: Subject to any disclaimer, the term of this patent is extended or adjusted under 35 U.S.C. 154(b) by 0 days.

(21) Appl. No.: 19/200,316

(22) Filed: May 6, 2025

Related U.S. Application Data

(60) Provisional application No. 63/760,008, filed on Feb. 18, 2025.

(51) Int. Cl.
  *G10L 17/26* (2013.01)
  *G10L 17/18* (2013.01)
  *G10L 25/57* (2013.01)

(52) U.S. Cl.
  CPC ............ *G10L 17/26* (2013.01); *G10L 17/18* (2013.01); *G10L 25/57* (2013.01)

(58) Field of Classification Search
  CPC .......... G10L 17/26; G10L 17/18; G10L 25/57
  USPC ....................................................... 704/270
  See application file for complete search history.

(56) References Cited

U.S. PATENT DOCUMENTS

| | | | |
|---|---|---|---|
| 11,929,078 B2* | 3/2024 | Tuo | G06F 21/32 |
| 12,189,712 B1* | 1/2025 | Bharaj | G06F 18/2132 |
| 12,288,379 B1* | 4/2025 | Bharaj | G06V 10/82 |
| 2020/0035247 A1* | 1/2020 | Boyadjiev | G06F 21/32 |

(Continued)

OTHER PUBLICATIONS

Achtibat et al. "AttnLRP: Attention-Aware Layer-Wise Relevance Propagation for Transformers," Proceedings of the 41st International Conference on Machine Learning, Jul. 21-Jul. 27, 2024, Vienna, Austria; pp. 1-34.

(Continued)

*Primary Examiner* — Edwin S Leland, III
(74) *Attorney, Agent, or Firm* — Morrison & Foerster LLP

(57) ABSTRACT

An exemplary method for generating a visual representation of manipulations in an audio signal includes inputting the audio signal into a trained machine-learning model, wherein the machine-learning model is trained by generating, based on a training bona fide audio signal, a training bona fide time-frequency representation; generating, based on a training spoofed audio signal, a training spoofed time-frequency representation, wherein the training spoofed audio signal is a manipulated version of the training bona fide audio signal; generating a training visual representation of manipulations in the training spoofed audio signal based at least on a difference between the training bona fide time-frequency representation and the training spoofed time-frequency representation; and training the audio deepfake detection machine-learning model based on the training visual representation of the manipulations in the training spoofed audio signal; and generating, by the machine-learning model, the visual representation of the manipulations in the audio signal.

22 Claims, 9 Drawing Sheets
(5 of 9 Drawing Sheet(s) Filed in Color)

(56) References Cited

U.S. PATENT DOCUMENTS

| | | | |
|---|---|---|---|
| 2023/0274758 A1* | 8/2023 | Markhasin | G10L 25/06 704/232 |
| 2023/0360653 A1* | 11/2023 | Yan | G10L 17/26 |
| 2024/0169042 A1* | 5/2024 | Kong | G06F 21/32 |
| 2025/0094837 A1* | 3/2025 | Malik | G06N 5/02 |
| 2025/0148788 A1* | 5/2025 | Bellinger | G06V 20/46 |
| 2025/0166358 A1* | 5/2025 | Bharaj | G06V 20/49 |
| 2025/0182510 A1* | 6/2025 | Malik | G06V 10/82 |

OTHER PUBLICATIONS

Amit et al. (2021). "SegDiff: Image Segmentation with Diffusion Probabilistic Models," arXiv:2112.00390: 1-13.
Arrieta et al. (2020). "Explainable Artificial Intelligence (XAI): Concepts, taxonomies, opportunities and challenges toward responsible AI," Information Fusion 58: 82-115.
Bai et al. (Jul. 2024). "Diffusion-Based Adversarial Purification for Speaker Verification," IEEE Signal Processing Letters, Journal of Latex Class Filed, 14(8): 1-5.
Cazenavette et al. "FakeInversion: Learning to Detect Images from Unseen Text-to-Image Models by Inverting Stable Diffusion," Proceedings of the 2024 IEEE/CVF Conference on Computer Vision and Pattern Recognition, Jun. 16-22, 2024, Seattle, USA; pp. 1-40.
Chefer et al. "Generic Attention-model Explainability for Interpreting Bi-Modal and Encoder-Decoder Transformers," Proceedings of the IEEE/CVF International Conference on Computer Vision, Oct. 11-17, 2021, Online, Canada; pp. 1-16.
Cordts et al. "The Cityscapes Dataset for Semantic Urban Scene Understanding," Proceedings of the 2016 IEEE Conference on Computer Vision and Pattern Recognition, Jun. 27-30, 2016, Las Vegas, USA; pp. 3213-3223.
Frank et al. "WaveFake: A Data Set to Facilitate Audio Deepfake Detection," 35th Conference on Neural Information Processing Systems (NeurIPS 2021) Track on Datasets and Benchmarks, Dec. 6-14, 2001, Virtual-only Conference; 26 pages.
Ge et al. "Explainable deepfake and spoofing detection: an attack analysis using Shapley Additive explanations," The Speaker and Language Recognition Workshop (Odyssey 2022), Jun. 28-Jul. 1, 2022, Beijing, China; pp. 70-76.
Ge et al. "Explaining Deep Learning Models for Spoofing and Deepfake Detection with Shapley Additive Explanations," IEEE International Conference on Acoustics, Speech and Signal Processing (ICASSP), May 23-27, 2022, Singapore; 5 pages.
Grinberg et al. (Jan. 2025). "What Does an Audio Deepfake Detector Focus on? A Study in the Time Domain," arXiv:2501.13887: 1-5.
Ho et al. (Jun. 2020) "Denoising Diffusion Probabilistic Models," Advances in neural information processing systems 33; pp. 1-25.
Jadon "A survey of loss functions for semantic segmentation," 2020 IEEE conference on computational intelligence in bioinformatics and computational biology (CIBCB), Oct. 27-29, 2020, Vina del Mar, Chile; 6 pages.
Kim et al. "Diff-SV: A Unified Hierarchical Framework For Noise-Robust Speaker Verification Using Score-Based Diffusion Probabilistic Models," 2024 IEEE International Conference on Acoustics, Speech and Signal Processing (ICASSP), Apr. 14-19, 2024, Seoul, Korea; pp. 10341-10345.
Kumar et al. (Mar. 2017). "A Dataset and a Technique for Generalized Nuclear Segmentation for Computational Pathology," IEEE Transactions on Medical Imaging 36(7): 1-11.
Kwak et al. (May 2023). "Voice Spoofing Detection Through Residual Network, Max Feature Map, and Depthwise Separable Convolution," IEEE Access 11: 49140-49152.
Li et al. (Apr. 2024). "Audio Anti-Spoofing Detection: A Survey," arXiv:2404.13914: 1-43.
Li et al. (Jun. 2024). "Interpretable Temporal Class Activation Representation for Audio Spoofing Detection," Interspeech 2024, arXiv:2406.08825: 5 pages.
Lim et al. (Apr. 13, 2022). "Detecting Deepfake Voice Using Explainable Deep Learning Techniques," Applied Sciences 12(3926): 1-15.
Liu et al. (Jun. 2024). "How Do Neural Spoofing Countermeasures Detect Partially Spoofed Audio?," Interspeech 2024, arXiv:2406.02483: 5 pages.
Mancini et al. (Sep. 2024). "LMAC-TD: Producing Time Domain Explanations for Audio Classifiers," arXiv:2409.08655: 1-5.
Müller et al. "Does Audio Deepfake Detection Generalize?," Proceedings of the 2022 Interspeech Conference, Sep. 18-22, 2022, Incheon, Korea; 5 pages.
Paissan et al. "Listenable Maps for Audio Classifiers," Proceedings of the 41st International Conference on Machine Learning, Jul. 21-Jul. 27, 2024, Vienna, Austria; pp. 1-13.
Prenger et al. "Waveglow: A Flow-Based Generative Network for Speech Synthesis," ICASSP 2019-2019 IEEE International Conference on Acoustics, Speech and Signal Processing (ICASSP), May 12-17, 2019, Brighton, United Kingdom; 5 pages.
Rottensteiner et al. (2014). "ISPRS Semantic Labeling Contest, ISPRS: Leopoldsh"ohe, Germany 1(4): 1 page.
Salvi et al. "Towards Frequency Band Explainability in Synthetic Speech Detection," 31st European Signal Processing Conference (EUSIPCO), Sep. 4-8, 2023, Helsinki, Finland; pp. 620-624.
Selvaraju et al. "Grad-CAM: Visual Explanations from Deep Networks via Gradient-based Localization," IEEE International Conference on Computer Vision (ICCV), Oct. 22-29, 2017, Venice, Italy; pp. 1-23.
Sudre et al. "Generalised Dice overlap as a deep learning loss function for highly unbalanced segmentations," Deep Learning in Medical Image Analysis and Multimodal Learning for Clinical Decision Support: Third International Workshop, DLMIA 2017, and 7th International Workshop, ML-CDS 2017, Held in Conjunction with MICCAI 2017, Sep. 14, 2017, Qu'ebec City, Canada; pp. 1-8.
Sun et al. "AI-Synthesized Voice Detection Using Neural Vocoder Artifacts," Proceedings of the IEEE/CVF Conference on Computer Vision and Pattern Recognition Workshops, Jun. 17-24, 2023, Vancouver, BC, Canada; pp. 904-912.
Sun et al. "DiffusionFake: Enhancing Generalization in Deepfake Detection via Guided Stable Diffusion," 38th Conference on Neural Information Processing Systems (NeurIPS 2024), Dec. 9-15, 2024, Vancouver, BC, Canada; 14 pages.
Tak et al. "An explainability study of the constant Q cepstral coefficient spoofing countermeasure for automatic speaker verification," The Speaker and Language Recognition Workshop (Odyssey 2020), Nov. 1-5, 2020, Tokyo, Japan; 8 pages.
Tak et al. "Automatic speaker verification spoofing and deepfake detection using wav2vec 2.0 and data augmentation," The Speaker and Language Recognition Workshop (Odyssey 2022), Jun. 28-Jul. 1, 2022, Beijing, China; 10 pages.
Tak et al. "Rawboost: A Raw Data Boosting and Augmentation Method Applied to Automatic Speaker Verification Anti-Spoofing," ICASSP 2022-2022 IEEE International Conference on Acoustics, Speech and Signal Processing (ICASSP)., May 22-27, 2022, Singapore; 5 pages.
Wang et al. (2020). "ASVspoof 2019: A large-scale public database of synthesized, converted and replayed speech," Computer Speech & Language, 64: 1-24.
Wang et al. (Apr. 2004). "Image Quality Assessment: From Error Visibility to Structural Similarity," IEEE Transactions on Image Processing 13(4): 1-14.
Wang et al. (Nov. 2019). "Neural source-filter waveform models for statistical parametric speech synthesis," IEEE/ACM Transactions on Audio, Speech, and Language Processing 28: pp. 1-14.
Wang et al. (Sep. 2018) "ESRGAN: Enhanced Super-Resolution Generative Adversarial Networks," located at https://doi.org/10.48550/arXiv, 1809.00219, (23 pages).
Wang et al. "Can Large-Scale Vocoded Spoofed Data Improve Speech Spoofing Countermeasure with a Self-Supervised Front End?," ICASSP 2024-2024 IEEE International Conference on Acoustics, Speech and Signal Processing (ICASSP), Apr. 14-19, 2024, Seoul, Korea; pp. 10311-10315.
Wang et al. "Spoofed Training Data for Speech Spoofing Countermeasure Can Be Efficiently Created Using Neural Vocoders," ICASSP

(56) References Cited

OTHER PUBLICATIONS 2023-2023 IEEE International Conference on Acoustics, Speech and Signal Processing (ICASSP), Jun. 4-10, 2023, Rhodes Island, Greece; pp. 1-5.

Zhang et al. (Sep. 2023). "The Impact of Silence on Speech Anti-Spoofing," IEEE/ACM Transactions on Audio, Speech, and Language Processing 31: 3374-3389.

Zhang et al. "Common Sense Reasoning for Deepfake Detection," 18th European Conference on Computer Vision, Sep. 29-Oct. 4, 2024, Milan, Italy; pp. 1-27.

* cited by examiner

100

102
Inputting the audio signal into a trained machine-learning model, wherein the machine-learning model is trained by:

112
generating, by the machine-learning model, the visual representation of the manipulations in the audio signal

104
generating, based on a training bona fide audio signal, a training bona fide time-frequency representation

106
generating, based on a training spoofed audio signal, a training spoofed time-frequency representation, wherein the training spoofed audio signal is a manipulated version of the training bona fide audio signal

108
generating a training visual representation of manipulations in the training spoofed audio signal based at least on a difference between the training bona fide time-frequency representation and the training spoofed time-frequency representation

110
training the machine-learning model based on the training visual representation of the manipulations in the training spoofed audio signal

FIG. 1B

| Method | GDice ↑ | $F_1$ ↑ | Segmentation IoU ↑ | FBound ↑ | SSIM ↑ |
|---|---|---|---|---|---|
| DeepSHAP | 10.93 / 8.78 | 6.50 / 4.24 | 3.43 / 2.21 | 33.30 / 19.81 | 37.03 / 33.29 |
| GradientSHAP | 11.71 / 10.28 | 7.31 / 5.82 | 3.99 / 3.03 | 30.45 / 27.12 | 33.55 / 31.12 |
| AttnLRP | 12.65 / 8.69 | 8.30 / 4.15 | 4.49 / 2.19 | 30.29 / 15.71 | 53.22 / 50.48 |
| ADDSegDiff | 48.26 / 52.03 | 45.69 / 49.65 | 31.23 / 36.33 | 57.36 / 56.78 | 69.04 / 74.85 |
| SpecSegDiff | 57.46 / 51.73 | 55.34 / 49.33 | 40.51 / 36.12 | 66.95 / 59.08 | 70.99 / 73.86 |

| Method | AI ↑ | Faithfulness AD ↓ | AG ↑ | Fin-In ↑ |
|---|---|---|---|---|
| DeepSHAP | 0.43 / 1.82 | 95.35 / 92.74 | 0.37 / 1.62 | 0.04 / 0.03 |
| GradientSHAP | 0.53 / 1.89 | 91.03 / 81.22 | 0.39 / 1.48 | 0.08 / 0.12 |
| AttnLRP | 0.42 / 1.82 | 96.38 / 92.06 | 0.37 / 1.62 | 0.03 / 0.03 |
| ADDSegDiff | 0.81 / 1.82 | 68.34 / 85.06 | 0.50 / 1.60 | 0.31 / 0.10 |
| SpecSegDiff | — | — | — | — |

FIG. 5

DATA-DRIVEN AUDIO DEEPFAKE DETECTION

CROSS-REFERENCE TO RELATED APPLICATIONS

This application claims the benefit of U.S. Provisional Application 63/760,008, filed on Feb. 18, 2025, the entire contents of which are incorporated herein by reference for all purposes.

FIELD

The present disclosure relates generally to machine-learning techniques, and more specifically to audio deepfake detection.

BACKGROUND

The rise of generative machine-learning techniques enables new capabilities to create and manipulate audio. While these advances empower human creativity and enable numerous AI-for-good applications, they can also be used to create and spread misinformation, potentially leading to social problems and security threats. As a result, with the increasing prevalence of Artificial Intelligence (AI)-generated media (deepfakes), a growing number of audio deepfake detection (ADD) algorithms are being developed to discern media authenticity and mitigate such serious concerns. Further, explainable AI (XAI) algorithms, which are designed to provide insight into the decision-making processes of machine-learning algorithms, are being developed to indicate which features or patterns in an audio file are manipulated, which can aid a user in discerning media authenticity or can be used to identify biases or weaknesses within an ADD model.

Traditional XAI methods such as GradCAM, SHAP, and LRP, have been used in the past to explain machine-learning model decisions in a variety of audio tasks. For some tasks, such as sound classification, verification that the sound matches the label can be done by listening to audio segments corresponding to the highlighted regions provided by the XAI model. However, there is a lack of accurate evaluation methods for explainable audio deepfake detection machine-learning models. For ADD tasks, it is often unclear what portions of an utterance correspond to manipulation, making it difficult for humans to interpret and evaluate the attributions produced by an ADD machine-learning model. Existing XAI tools do not provide consistent explanations in the time domain, which further necessitates careful evaluation of these methods.

While there are several conventional explanatory audio deepfake detection methods, only a few utilize state-of-the-art models directly operate on raw waveforms. These models are further limited to time-domain explanations only, which allow for only a partial understanding of the model behavior, as artifacts can be found in specific frequency sub-bands. Another reason current explanatory ADD machine-learning models are limited and struggle to provide accurate explanations is due to the lack of clear ground truth annotations. Conventional methods use either vocoded data as a training source for the ADD systems themselves or use exploratory studies on the statistical differences between real and fake samples, such as average pitch or energy across frequency bins.

Further, current methods for explanatory ADD are limited and struggle to provide accurate explanations because these methods have been specifically invented for computer vision-based deepfake detection tasks where there is a clear notion of an object being present in an image. In contrast, in audio deepfakes, the artifacts are very subtle, sparse, and lack clear structure, such that conventional methods focus on the entire audio signal rather than the artifacts. For example, explanatory ADD models focus on the content that is being spoken rather than the nuance in how the content is being spoken, which is flawed because a real speaker and a fake speaker can produce the same spoken content, but can differ in the style of their speaking.

SUMMARY

Disclosed herein are systems, electronic devices, methods, non-transitory storage media, and apparatuses for providing a visual representation of manipulations in an audio signal. The visual representation of the manipulations in an audio file can clearly indicate which portions of an audio signal are manipulated in time and/or frequency domains. An exemplary system can receive, from a user, an audio signal and input the audio signal into an explainable audio deepfake detection (ADD) machine-learning model trained to provide a visual representation of manipulation in the audio signal. The explainable ADD machine-learning model can be trained by: generating, based on a training bona fide audio signal, a training bona fide time-frequency representation; generating, based on a training spoofed audio signal, a training spoofed time-frequency representation, wherein the training spoofed audio signal is a manipulated version of the training bona fide audio signal; generating a training visual representation of manipulations in the training spoofed audio signal based at least on a difference between the training bona fide time-frequency representation and the training spoofed time-frequency representation; and training the audio deepfake detection machine-learning model based on the training visual representation of the manipulations in the training spoofed audio signal.

Embodiments of the present disclosure provide a data-driven explainable artificial intelligence method. An explainable ADD machine-learning model can be trained using the difference between real and vocoded utterances as the supervisory signal to account for the specificity of the audio deepfake detection task. To enable training of the explainable ADD machine-learning model, a novel dataset including (1) pairs of bona-fide (or real) and spoofed (or fake) audio signals that are aligned in time, utterance, and speaker attributes and (2) corresponding ground truth explanations is provided. The audio signals can be sourced from public databases such as VocV4 and LibriSeVoc. The system can generate time-frequency representations (e.g., spectrograms) of the bona-fide and spoofed audio signals and use the difference between the time-frequency representations as the ground truth explanation (also referred to as a ground truth annotation). Since the bona-fide audio signal and spoofed audio signal are aligned in time, utterance, and speaker attributes, the difference between the time-frequency representations can represent artifacts (in both the time and frequency domains) of the audio deepfake generator that produced the spoofed audio signal. The ground truth explanation can then be used as a supervising signal to train the explainable ADD machine-learning model to expose the deepfake artifacts in a given spoofed (e.g., vocoded) audio.

Embodiments of the present disclosure can be classifier-agnostic and can predict visual representations (e.g., heatmaps) highlighting the more suspicious regions in the time-frequency domain by training the explainable ADD machine-learning model on spoof spectrograms and corresponding ground truth annotations. Additionally, embodiments of the present disclosure can obtain post-hoc classifier-specific attributions by conditioning the explainable ADD machine-learning model on intermediate features from the same classifier. In this way, the explainable ADD machine-learning model can provide explanations in the joint time-frequency domain for a state-of-the-art deepfake classifier which operates on raw waveforms.

Embodiments of the present disclosure provide a number of technical advantages. The systems described herein improve on conventional explainable ADD techniques by extending from time domain only explanations to time-frequency domain explanations, which are more robust and accurate. Further, training the explainable ADD machine-learning model on the ground truth explanations enables the explainable ADD machine-learning model to focus on artifacts in the spoofed audio signal, rather than on the entire audio signal. Thus, the explainable ADD machine-learning model can be more accurate than conventional methods which may focus on the content that is being spoken rather than the nuance in how the content is being spoken. Experiments show that embodiments of the present disclosure outperformed traditional explainability techniques both qualitatively and quantitively because the embodiments of the present disclosure were trained with the ground truth explanations. Further, in the case of the classifier-specific embodiments, experiments show that the proposed explainable ADD machine-learning model produces attributions that are more faithful to the classifier.

An exemplary method for generating a visual representation of manipulations in an audio signal comprises: inputting the audio signal into a trained machine-learning model, wherein the machine-learning model is trained by: generating, based on a training bona fide audio signal, a training bona fide time-frequency representation; generating, based on a training spoofed audio signal, a training spoofed time-frequency representation, wherein the training spoofed audio signal is a manipulated version of the training bona fide audio signal; generating a training visual representation of manipulations in the training spoofed audio signal based at least on a difference between the training bona fide time-frequency representation and the training spoofed time-frequency representation; and training the audio deepfake detection machine-learning model based on the training visual representation of the manipulations in the training spoofed audio signal; and generating, by the machine-learning model, the visual representation of the manipulations in the audio signal.

In some embodiments, the method further comprises displaying the visual representation of the manipulations in the audio signal. In some embodiments, the method further comprises displaying one or more timestamps associated with the manipulations in the audio signal.

In some embodiments, the method further comprises: inputting the visual representation of the manipulations in the audio signal into a language model; and generating, by the language model, a natural language description of the manipulations in the audio signal. In some embodiments, the language model is trained based on the training visual representation of the manipulations in the training spoofed audio signal and a natural-language description of the manipulations in the training spoofed audio signal. In some embodiments, the method further comprises displaying the natural language description of the manipulations in the audio signal.

In some embodiments, the audio signal comprises a real-time signal from a telephone call. In some embodiments, the method further comprises automatically terminating the telephone call. In some embodiments, the method further comprises displaying a warning that the telephone call comprises manipulations. In some embodiments, the method further comprises outputting a recommendation to terminate the telephone call.

In some embodiments, the audio signal comprises a recorded voicemail message. In some embodiments, the method further comprises displaying a warning that the recorded voicemail message comprises manipulations.

In some embodiments, the training bona fide time-frequency representation and the training spoofed time-frequency representation are spectrograms. In some embodiments, the training bona fide audio signal comprises one or more utterances by a speaker and the training spoofed audio signal comprises a manipulated version of the one or more utterances by the speaker. In some embodiments, the training spoofed audio signal is generated by a deepfake machine-learning model based on the training bona fide audio signal. In some embodiments, the training bona fide audio signal and the training spoofed audio signal are time synchronized.

In some embodiments, generating the training visual representation of the manipulations in the training spoofed audio signal further comprises: smoothing the training bona fide time-frequency representation; and smoothing the training spoofed time-frequency representation, wherein the difference between the training bona fide time-frequency representation and the training spoofed time-frequency representation is calculated by subtracting the smoothed training bona fide time-frequency representation from the smoothed training spoofed time-frequency representation.

In some embodiments, generating the training visual representation of the manipulations in the training spoofed audio signal further comprises normalizing the difference between the training bona fide time-frequency representation and the training spoofed time-frequency representation.

In some embodiments, the machine-learning model comprises a diffusion model. In some embodiments, the machine-learning model comprises a convolutional neural network.

An exemplary system for generating a visual representation of manipulations in an audio signal, comprises: one or more processors; one or more memories; and one or more programs, wherein the one or more programs are stored in the one or more memories and configured to be executed by the one or more processors, the one or more programs including instructions for: inputting the audio signal into a trained machine-learning model, wherein the machine-learning model is trained by: generating, based on a training bona fide audio signal, a training bona fide time-frequency representation; generating, based on a training spoofed audio signal, a training spoofed time-frequency representation, wherein the training spoofed audio signal is a manipulated version of the training bona fide audio signal; generating a training visual representation of manipulations in the training spoofed audio signal based at least on a difference between the training bona fide time-frequency representation and the training spoofed time-frequency representation; and training the audio deepfake detection machine-learning model based on the training visual representation of the manipulations in the training spoofed audio signal; and generating, by the machine-learning model, the visual representation of the manipulations in the audio signal.

An exemplary non-transitory computer-readable storage medium storing one or more programs for generating a visual representation of manipulations in an audio signal, the one or more programs comprising instructions, which when executed by one or more processors of an electronic device, cause the electronic device to perform: inputting the audio signal into a trained machine-learning model, wherein the machine-learning model is trained by: generating, based on a training bona fide audio signal, a training bona fide time-frequency representation; generating, based on a training spoofed audio signal, a training spoofed time-frequency representation, wherein the training spoofed audio signal is a manipulated version of the training bona fide audio signal; generating a training visual representation of manipulations in the training spoofed audio signal based at least on a difference between the training bona fide time-frequency representation and the training spoofed time-frequency representation; and training the audio deepfake detection machine-learning model based on the training visual representation of the manipulations in the training spoofed audio signal; and generating, by the machine-learning model, the visual representation of the manipulations in the audio signal.

BRIEF DESCRIPTION OF THE FIGURES

The patent or application file contains at least one drawing executed in color. Copies of this patent or patent application publication with color drawings(s) will be provided by the Office upon request and payment of the necessary fee.

A better understanding of the features and advantages of the present disclosure will be obtained by reference to the following detailed description that sets forth illustrative embodiments, in which the principles of the disclosure are utilized, and the accompanying drawings of which:

FIG. 1A illustrates an exemplary process for generating a visual representation of manipulations in an audio signal, in accordance with some embodiments.

FIG. 1B illustrates an exemplary process for training a machine-learning model to generate a visual representation of manipulations in an audio signal, in accordance with some embodiments.

FIG. 5 provides exemplary quantitative experimental results of explainable artificial intelligence methods evaluated on VocV4 and LibriSeVoc datasets, in accordance with some embodiments.

DETAILED DESCRIPTION

Figure 2:
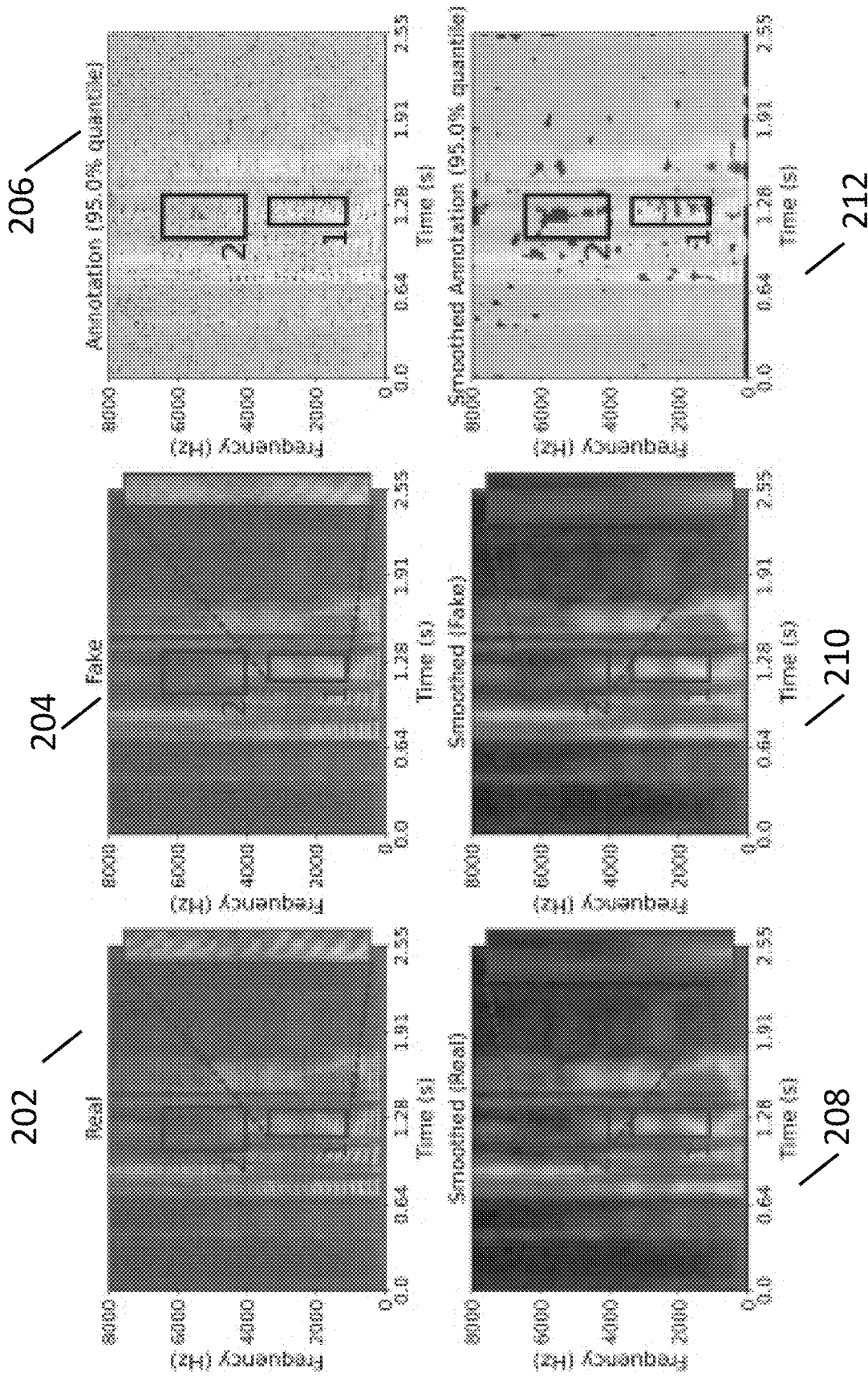
FIG. 2 illustrates exemplary spectrograms for bona-fide audio signals and spoofed audio signals and exemplary ground truth annotations, in accordance with some embodiments.

Disclosed herein are systems, electronic devices, methods, non-transitory storage media, and apparatuses for detecting manipulations in an audio signal and providing a visual representation of the manipulations. An exemplary system can receive, from a user, an audio signal and input the audio signal into a trained explainable audio deepfake detection (ADD) machine-learning model. The system can output a visual representation of manipulations in the audio signal, thus providing robust explainability for the audio deepfake detection (ADD) machine-learning model. The techniques disclosed herein provide enhanced accuracy and explainability for AI models, including diffusion-based audio deepfake detection models.

Embodiments of the present disclosure can be classifier-agnostic and can predict heatmaps highlighting the most suspicious regions in the time-frequency domain by training the explainable ADD machine-learning model on spoof spectrograms and corresponding ground truth annotations. Additionally, embodiments of the present disclosure can obtain post-hoc classifier-specific attributions by conditioning the explainable ADD machine-learning model on intermediate features from the same classifier. In this way, the explainable ADD machine-learning model can provide explanations in the joint time-frequency domain for a state-of-the-art deepfake classifier which operates on raw waveforms.

Embodiments of the present disclosure provide a data-driven explainable artificial intelligence method. An explainable ADD machine-learning model can be trained using the difference between real and vocoded utterances as the supervisory signal (or ground truth explanation) to account for the specificity of the audio deepfake detection task. To enable training of the explainable ADD machine-learning model, a novel dataset including (1) pairs of bona-fide (or real) and spoofed (or fake) audio signals that are aligned in time, utterance, and speaker attributes and (2) corresponding ground truth explanations is provided. The audio signals can be sourced from public databases such as VocV4 and LibriSeVoc. The system can generate time-frequency representations (e.g., spectrograms) of the bona-fide and spoofed audio signals and use the difference between the time-frequency representations as the ground truth. Since the bona-fide audio signal and spoofed audio signal are aligned in time, utterance, and speaker attributes, the difference between the time-frequency representations can represent artifacts (in both the time and frequency domains) of the audio deepfake generator that produced the spoofed audio signal. The ground truth explanation can then be used as a supervising signal to train the explainable ADD machine-learning model to expose the deepfake artifacts in a given spoofed (e.g., vocoded) audio.

Embodiments of the present disclosure provide a number of technical advantages. The systems described herein improve on conventional explainable ADD techniques by extending from time domain-only explanations to time-frequency domain explanations, which are more robust, accurate, and helpful to a user. Further, training the explainable ADD machine-learning model on the ground truth explanations enables the explainable ADD machine-learning model to focus on artifacts in the spoofed audio signal, rather than on the entire audio signal. Thus, the explainable ADD machine-learning model can be more accurate than conventional methods which may focus on the content that is being spoken rather than the nuance in how the content is being spoken. Experiments show that embodiments of the present disclosure outperformed traditional explainability techniques both qualitatively and quantitatively because the embodiments of the present disclosure were trained with the ground truth explanations. Further, in the case of the classifier-specific embodiments, experiments show that the proposed explainable ADD machine-learning model produces attributions that are more faithful to the classifier.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

FIG. 1A illustrates aspects of an exemplary process 100 for generating a visual representation of deepfake manipulations in an audio signal, in accordance with some embodiments. Exemplary process 100 can be used to inform a user of manipulations in the audio signal and/or to evaluate the accuracy of an ADD model for further training. The visual representation can clearly indicate at which times the audio signal was manipulated and at which frequencies the audio signal was manipulated. Process 100 is performed, for example, using one or more electronic devices implementing a software platform. In some examples, process 100 is performed using a client-server system, and the blocks of process 100 are divided up in any manner between the server and a client device. In other examples, the blocks of process 100 are divided up between the server and multiple client devices. Thus, while portions of process 100 may be described herein as being performed by particular devices of a client-server system, it will be appreciated that process 100 is not so limited. In other examples, process 100 is performed using only a client device or only multiple client devices. In process 100, some blocks are, optionally, combined, the order of some blocks is, optionally, changed, and some blocks are, optionally, omitted. In some examples, additional steps may be performed in combination with the process 100. Accordingly, the operations as illustrated (and described in greater detail below) are exemplary by nature and, as such, should not be viewed as limiting.

At block 102, an exemplary audio deepfake detection system (e.g., one or more electronic devices) may input an audio signal into a trained explainable audio deepfake detection (ADD) machine-learning model. The audio signal may be obtained from any audio source and may include real audio and/or audio generated using one or more machine-learning models (e.g., synthetically generated audio). The audio signal may be or include a raw audio waveform. The audio signal may form part of a file containing a plurality of audio signals. The audio signal may be a processed audio signal. The audio signal may include speech, non-speech, silence, or any combination thereof. The speech may include identifiable sentences, phrases, words, consonants, unstressed vowels, primary-stressed vowels, secondary-stressed vowels, voice onsets, voice offsets, or any combination thereof. The non-speech may include noise other than human speech. The audio signal may be detected by an electronic acoustic sensor of the exemplary system. The audio signal may be detected by a sensor of a different system and transmitted to the system performing process 100 (e.g., via any wired or wireless electronic communications protocol). The audio signal may be obtained by the exemplary system from one or more electronic databases. The audio signal may be generated, at least in part, by one or more machine-learning models. The audio signal may be an audio signal from a telephone/video call, a recorded voicemail/video message, a video, an authentication request, or the like.

In some examples, the explainable ADD machine-learning model may include a convolutional neural network. In some examples, the explainable ADD machine-learning model may include a diffusion model. In some examples, the explainable ADD machine-learning model may include a modified SegDiff diffusion model. The SegDiff diffusion model is described in, for example, T. Amit, T. Shaharbany, E. Nachmani, and L. Wolf, "Segdiff: Image segmentation with diffusion probabilistic models," arXiv preprint arXiv: 2112.00390, 2021, which is incorporated herein by reference in its entirety for all purposes. For example, the explainable ADD machine-learning model may include a SpecSegDiff model, and inputting an audio signal into the trained explainable ADD machine-learning model may include generating a time-frequency representation of the audio signal and inputting the time-frequency representation of the audio signal as conditioning into the SpecSegDiff model. In another example, the explainable ADD machine-learning model may include a ADDSegDiff model, and inputting an audio signal into the trained explainable ADD machine-learning model may include inputting the audio signal into a frozen, pre-trained ADD model (in which weights of the model remain constant) to obtain intermediate features (e.g., latent features) of the audio signal and inputting the intermediate features from the pre-trained ADD model as conditioning into the ADDSegDiff model. The intermediate features are the features extracted by the pre-trained ADD from the audio signal, and may indicate which features the pre-trained ADD used to make a real vs. fake audio classification. In some examples, the explainable ADD machine-learning model can be classifier agnostic (e.g., an explainable ADD machine-learning model including a SpecSegDiff model), and may not rely on any other classification model. In some examples, the explainable ADD machine-learning model can be classifier-specific (e.g., an explainable ADD machine-learning model including an ADDSegDiff model), and may rely on a classification model (e.g., a pre-trained ADD model). Additional details regarding the architecture and the operations of the explainable ADD machine-learning model are described herein with reference to FIG. 3A and FIG. 3B.

The ADD machine-learning model may be trained to generate a visual representation of manipulations in an audio signal. FIG. 1B illustrates aspects of an exemplary process 150 for training the ADD machine-learning model to generate a visual representation of deepfake manipulations in an audio signal, in accordance with some embodiments. Blocks 104-110 may occur before process 100 such that the audio signal is input into a trained machine learning model that has been trained based on the steps of 104-110 of process 150.

At block 104, an exemplary training system generates, based on a training bona fide audio signal, a training bona fide time-frequency representation. The training bona fide audio signal can include one or more utterances by a natural speaker (e.g., a human). The training bona fide time-frequency representation can be a spectrogram. For Example, FIG. 2 shows an exemplary training bona fide time-frequency representation 202 in a spectrogram format.

Referring back to FIG. 1B, at block 106, the training system generates, based on a training spoofed audio signal, a training spoofed time-frequency representation. The training spoofed audio signal can be a manipulated version of the training bona fide audio signal. For example, the training bona fide audio signal can include one or more utterances by a speaker and the training spoofed audio signal can include a manipulated version of the one or more utterances by the speaker. The training spoofed audio signal can be generated by a machine-learning model based on the training bona fide audio signal. For example, the training spoofed audio signal can be generated by a vocoder. Vocoders can be integral components in many text-to-speech and voice conversion systems. The training spoofed audio signal can be synthesized by applying a vocoder on the training bona fide audio signal or the training bona fide time-frequency representation derived from the training bona fide audio signal. The training bona fide audio signal and the training spoofed audio signal can be time synchronized. In some examples, the training bona-fide audio signal and the training spoofed audio can be obtained from vocoded datasets exist, such as VocV4 and LibriSeVoc, which contain parallel bona fide audio signals and spoofed audio signals with the same speaker and time-synchronized spoken content. Since the training bona-fide audio signal and the training spoofed audio can be aligned in speaker, time, and content attributes, the only distinction between the training bona-fide audio signal and the training spoofed audio (and thus the only distinction between the training bona fide time-frequency representation and the training spoofed time-frequency representation) can be the introduction of artifacts from the vocoder. This difference can be used to create ground truth explanations, which enables the evaluation of explainable ADD machine-learning models. While reference is made to a vocoder, it should be understood that the spoofed audio signal can be generated by any technology that can generate deepfake audio, such as text-to-speech systems, voice cloners, autoencoders, speech synthesis models, or other audio manipulation software.

The training spoofed time-frequency representation can be a spectrogram. For example, FIG. 2 shows an exemplary training spoofed time-frequency representation 204 in a spectrogram format. The rectangle annotations can show manipulated regions in the training spoofed time-frequency representation 204 compared to the training bona-fide time-frequency representation 202. For example, rectangle 1 may show missed harmonics and rectangle 2 may show energy loss in the training spoofed time-frequency representation 204 compared to the training spoofed time-frequency representation 202.

Referring back to FIG. 1B, at block 108, the training system generates a training visual representation of manipulations in the training spoofed audio signal. The training visual representation of manipulations in the training spoofed audio signal can be based at least on a difference between the training bona fide time-frequency representation and the training spoofed time-frequency representation. For example, the training visual representation of manipulations in the training spoofed audio signal can be generated by subtracting the training bona fide time-frequency representation from the training spoofed time-frequency representation. As discussed previously, any differences between the training bona fide time-frequency representation and the training spoofed time-frequency representation may be caused by the introduction of artifacts from the machine-learning model that generated the training spoofed audio signal. Accordingly, the training visual representation of manipulations in the training spoofed audio signal can be considered a ground truth explanation.

The visual representation of manipulations in the audio signal can be a heatmap with 2 dimensions, time and frequency, and can indicate both at which frequencies and at what times the manipulations occur. For example, FIG. 2 shows an exemplary training visual representation of manipulations in the training spoofed audio signal 206 generated by subtracting the training bona fide time-frequency representation 202 from the training spoofed time-frequency representation 204. A visual representation of manipulations generated by directly subtracting the raw training bona fide time-frequency representation from the raw training spoofed time-frequency representation can be noisy as it indicates all regions of manipulation, including manipulations that cannot be detected by a human.

Referring back to FIG. 1B, to identify dense regions of manipulations that are more meaningful and more likely to be recognized by humans, at block 108, the training system may smooth the training bona fide time-frequency representation and the training spoofed time-frequency representation. For example, the training bona fide time-frequency representation and the training spoofed time-frequency representation can be smoothed using a 2-D Gaussian kernel G. The 2-D Gaussian kernel G may have a size (3, 11) and a variance of (3, 5) for the time and frequency dimensions, respectively. The difference between the training bona fide time-frequency representation and the training spoofed time-frequency representation can be calculated by subtracting the smoothed training bona fide time-frequency representation from the smoothed training spoofed time-frequency representation. In some examples, the difference between the training bona fide time-frequency representation and the training spoofed time-frequency representation can be normalized since the low frequency bins contain more energy (larger magnitude) than the high frequency bins. For example, the training visual representation of manipulations in the training spoofed audio signal can be generated by binarizing the normalized values as follows:

$$\text{Training visual representation of manipulations} = \left( \frac{|G(M_S) - G(M_B)|}{G(M_B)} \right) > \tau \quad (1)$$

where $G(M_S)$ is the smoothed training spoofed time-frequency representation, $G(M_B)$ is the smoothed training bona fide time-frequency representation, and t is the threshold corresponding to the 95% quantile of the normalized values.

For example, FIG. 2 shows an exemplary smoothed training bona fide time-frequency representation 208, an exemplary smoothed training spoofed time-frequency representation 210, and an exemplary training visual representation of manipulations in the training spoofed audio signal 212 generated by subtracting the smoothed training bona fide time-frequency representation 208 from the smoothed training spoofed time-frequency representation 210 and normalizing the difference. As shown by the rectangles, the smoothed and normalized exemplary training visual representation of manipulations in the training spoofed audio signal 212 clearly shows the manipulated regions of the training spoofed audio signal.

Referring back to FIG. 1B, at block 110, the training system can train the ADD machine-learning model based on the training visual representation of the manipulations in the training spoofed audio signal. As with any deep learning technique, model generalization to unseen vocoders, speakers, and other conditions is an important aspect. Leveraging large pretrained diffusion backbones and scaling the training to diverse datasets containing annotations for many spoofing algorithms can improve robustness.

Referring back to FIG. 1A, at block 112, the trained ADD machine-learning model can generate the visual representation of the manipulations in the audio signal. The visual representation of the manipulations in the audio signal can indicate the manipulated regions in the audio and may not indicate non-manipulated regions in the audio. The visual representation of manipulations in the audio signal can be a heatmap with 2 dimensions, time and frequency, and can indicate at which frequencies and at which times in the audio signal that the manipulations occur.

In some examples of process 100, the audio deepfake detection system can display the visual representation of the manipulations in the audio signal. In some examples of process 100, the audio deepfake detection system can display one or more timestamps associated with the manipulations in the audio signal based on the visual representation of the manipulations in the audio signal.

In some examples of process 100, the audio deepfake detection system can input the visual representations of manipulations in the audio signal into a language model. The language model can generate a natural language description of the manipulations in the audio signal. The audio deepfake detection system can display the natural language description of the manipulations in the audio signal.

In some examples, the language model can be trained based on the training visual representation of the manipulations in the training spoofed audio signal and a training natural-language description of the manipulations in the training spoofed audio signal. For example, the training natural-language description of the manipulations in the training spoofed audio signal can be obtained by human annotator who has listened to the training spoofed audio signal. The training natural-language description can include natural language descriptions of why the human annotator thinks particular portions of the audio signal are manipulated. For example, the training natural-language description of the manipulations in the training spoofed audio signal can include natural language descriptions of inconsistencies or irregularities in the tone or pitch of the speaker, inconsistencies or irregularities in the pronunciation of words, inconsistencies or irregularities in the speech patterns (e.g., unnatural rhythm, pacing, or cadence), inconsistencies or irregularities in pauses between words, distortions in speech, inconsistencies or irregularities in the emotion of the speaker, inconsistencies or irregularities in background noises, and/or inconsistencies or irregularities in breathing sounds of the speaker, as well as timestamps associated with these inconsistencies or irregularities.

In some examples, when the audio signal is a real-time signal from a telephone call, the audio deepfake detection system can automatically terminate the telephone call if the visual representations of manipulations in the audio signal indicates the audio signal includes manipulations. In some examples, when the audio signal is a signal from a telephone call, the audio deepfake detection system can automatically output a warning (e.g., visual warning, haptic warning, auditory warning, or the like) that the telephone call comprises manipulations if the visual representations of manipulations in the audio signal indicates the audio signal includes manipulations. In some examples, when the audio signal is a signal from a telephone call, the audio deepfake detection system can automatically output a recommendation to terminate the telephone call if the visual representations of manipulations in the audio signal indicates the audio signal includes manipulations. In some examples, when the audio signal is a recorded voicemail message, the audio deepfake detection system can output a warning that the recorded voicemail message comprises manipulations if the visual representations of manipulations in the audio signal indicates the audio signal includes manipulations. In some examples, the system may make multiple determinations for different portions of an audio signal. For example, the system may make a first determination for a first portion of an audio signal (e.g., the first 30 seconds of an audio signal) and make a second determination for a second portion of the audio signal (e.g., the next 30 seconds of the audio signal) and aggregate the results of the determinations to determine if a warning or recommendation should be outputted based on one or more predefined criteria. It should be appreciated that the audio signal can come from any type of data obtained in any contexts (e.g., phone calls, video calls, authentication requests, media, or the like). In some embodiments, the results of deepfake detection can be associated with particular phone numbers, accounts, entities, locations, or other attributes to identify suspicious actors and for further analytics and reporting.

In some examples, where the explainable ADD machine-learning model is classifier-specific (e.g., an explainable ADD machine-learning model including a ADDSegDiff model), and depends on a pre-trained ADD model (e.g., a classifier), the visual representation of manipulations in the audio signal can be used to fine-tune the pre-trained ADD model (e.g., by altering hyperparameters). For example, where ADD machine-learning model includes a ADDSegDiff model and receives an input of intermediate features from a frozen, pre-trained ADD model as conditioning, the visual representation of manipulations in the audio signal can be used to inform a user how to tune the frozen ADD model to improve accuracy.

Figure 3A:
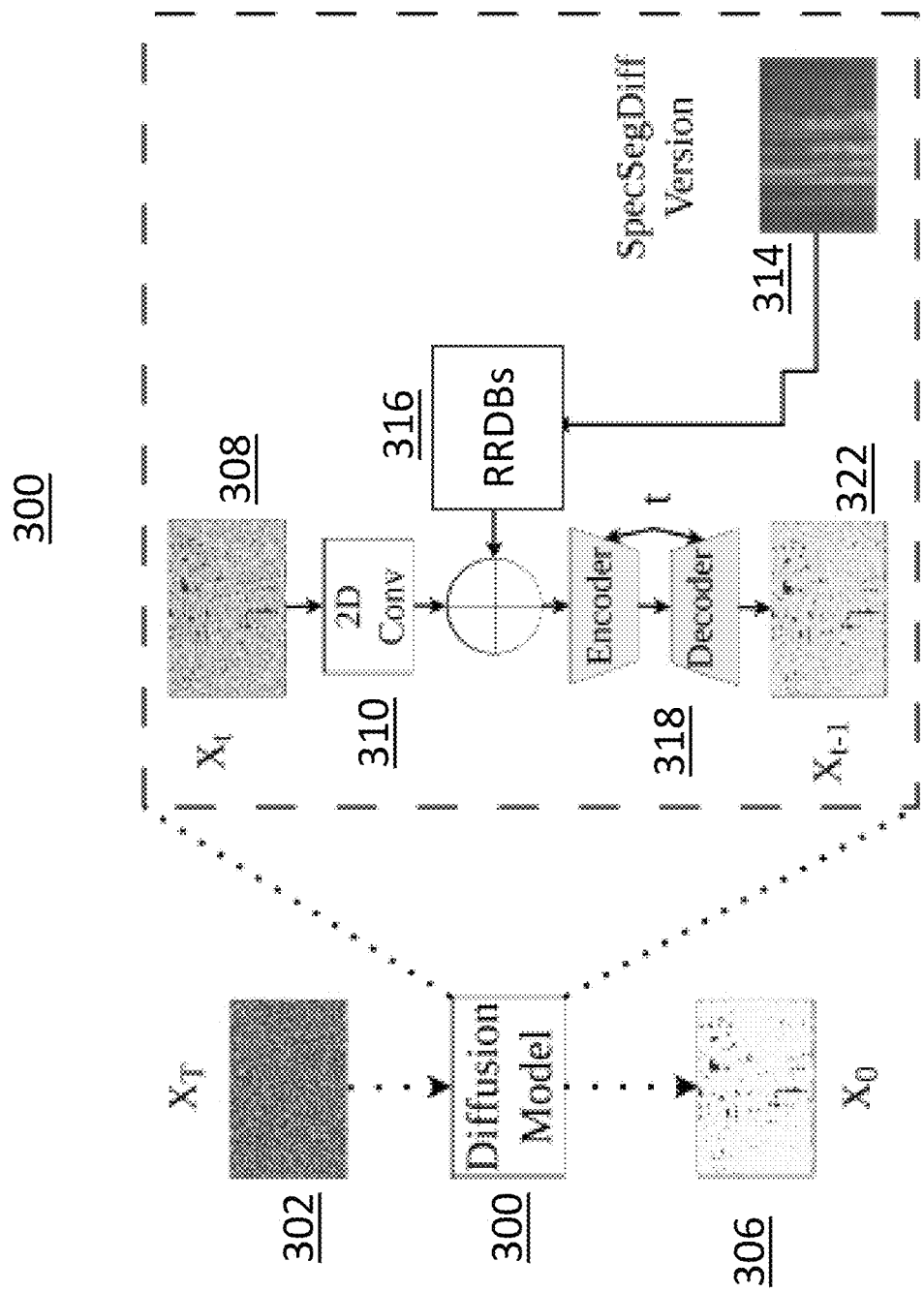
FIG. 3A illustrates an exemplary architecture of a classifier-agnostic explainable audio deepfake detection (ADD) model, in accordance with some embodiments.
Figure 3B:
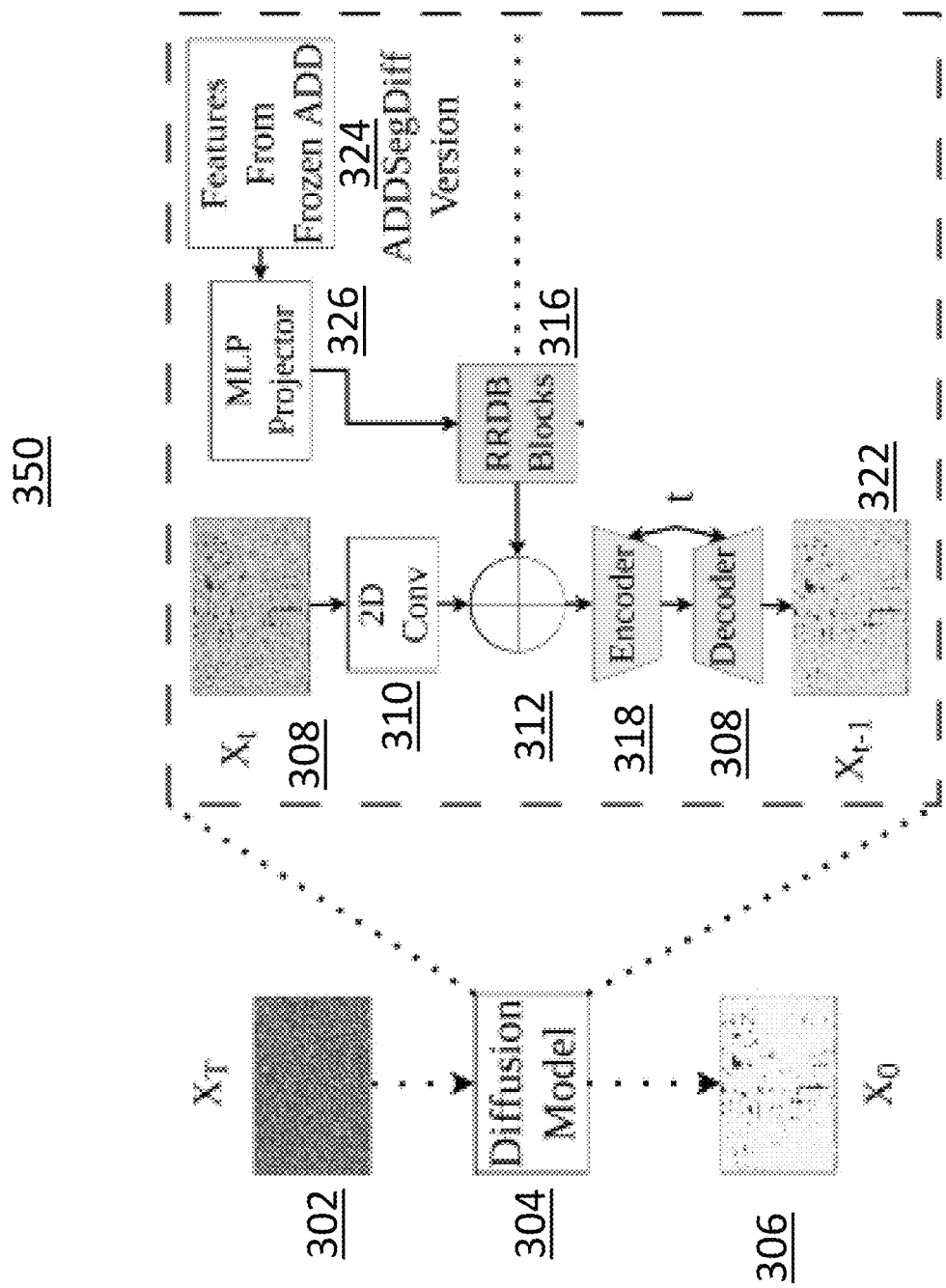
FIG. 3B illustrates an exemplary architecture of a classifier-specific explainable audio deepfake detection (ADD) model, in accordance with some embodiments.

FIG. 3A and FIG. 3B illustrate exemplary architectures of explainable ADD machine-learning models. FIG. 3A illustrates an explainable ADD machine-learning model 300 (also referred to as SpecSegDiff model 300) that is classifier-agnostic. FIG. 3B illustrates an explainable ADD machine-learning model 350 (also referred to as ADDSegDiff 350) that is classifier-specific. Explainable ADD machine-learning model 300 and explainable ADD machine-learning model 350 can be configured to generate a visual representation of manipulations in an audio signal. In some embodiments, explainable ADD machine-learning model 300 and explainable ADD machine-learning model 350 can comprise diffusion models. In some embodiments, explainable ADD machine-learning model 300 and explainable ADD machine-learning model 350 can be modified versions of the SegDiff diffusion model. SegDiff is a diffusion model with high segmentation quality that can surpass non-diffusion approaches on a variety of datasets, including those with sparse masks. Explainable ADD machine-learning model 300 and explainable ADD machine-learning model 350 can be trained using ground truth explanations to predict artifact regions. As explained above, the ground truth explanations can be determined based on the difference in the time-frequency domain between a bona-fide audio signal and a spoofed audio signal that are aligned in speaker, time, and content attributes, such that the only distinction between the bona-fide audio signal and the spoofed audio in the time-frequency domain may be the introduction of artifacts from the vocoder that produced the spoofed audio. In this way, the explainable ADD machine-learning model 300 and explainable ADD machine-learning model 350 can be trained to identify spoofed audio based on artifacts of a vocoder, which reduces or eliminates the likelihood that explainable ADD machine-learning model 300 or explainable ADD machine-learning model 350 focus on the wrong features (e.g., spoken content) when detecting spoofed audio signals.

With reference to FIG. 3A, the SpecSegDiff model 300 comprises a segmentation map image encoder 310 comprising a 2-D convolutional layer, a conditioning image encoder 316 comprising Residual in Residual Dense Blocks (RRDBs), and an encoder-decoder architecture 318 comprising an encoder and a decoder (e.g., a UNet-like encoder-decoder architecture with 2 residual blocks per level). In some embodiments, conditioning image encoder 316 comprises 12 RRDBs. The SpecSegDiff model 300 can take an input of random noise XT 302, perform T iterations of de-noising based on a conditioning input, and output a visual representation of manipulations in an audio signal $X_0$ 306. SpecSegDiff model 300 can take a time-frequency representation of the audio signal 314 (e.g., a spectrogram of the audio signal) as the conditioning input. SpecSegDiff model 300 can be considered a classifier-agnostic model because the conditioning input is based on the audio signal itself rather than the output of an ADD model (e.g., a classifier). In that way, SpecSegDiff model 300 can generate visual representations of manipulations in an audio signal without relying on another model to classify the audio signal (or regions of the audio signal) as manipulated.

At each de-noising step t, an input segmentation map $X_t$ (which may be the random noise input $X_T$ or the output of the previous de-noising step), can be input into segmentation map image encoder 310 to obtain extracted segmentation map feature embeddings. The time-frequency representation of the audio signal 314 can be input into the conditioning image encoder 316 to obtain extracted conditioning input feature embeddings, which can be summed with the extracted segmentation map feature embeddings. The sum can then pass to encoder-decoder architecture 318, which refines the sum to obtain an output segmentation map $X_{t-1}$, which can be used as the input for the next step. De-noising step t can occur T times, until the visual representation of manipulations in the audio signal $X_0$ 306 is obtained. T can be a hyperparameter selected after experimentation.

With reference to FIG. 3B, the ADDSegDiff model 350 can comprise similar structure to SpecSegDiff model 300. For example, the ADDSegDiff model 350 can comprise a segmentation map image encoder 310 comprising a 2-D convolutional layer, a conditioning image encoder 316 comprising Residual in Residual Dense Blocks (RRDBs), and an encoder-decoder architecture 318 comprising an encoder and a decoder (e.g., a UNet-like encoder-decoder architecture with 2 residual blocks per level). However, ADDSegDiff model 350 may comprise fewer RRDBs than SpecSegDiff model 300. For example, in some embodiments, conditioning image encoder 316 may comprise 1 RRDB. Further, ADDSegDiff model 350 may comprise a multilayer perceptron (MLP) projector 326, which may be a 2-layer MLP projector. Similarly to SpecSegDiff model 300, the ADDSegDiff model 350 can take an input of random noise XT 302, perform T iterations of de-noising based on a conditioning input, and output a visual representation of manipulations in an audio signal $X_0$ 306. In contrast to SpecSegDiff model 300, ADDSegDiff can take an input intermediate features 324 (e.g., latent features) from a frozen, pre-trained ADD model (e.g., a classifier) as the conditioning input. ADDSegDiff model 350 can be considered a classifier-specific model because the conditioning input is based on the output of a pre-trained ADD model (e.g., a classifier). In that way, ADDSegDiff model 350 can generate visual representations of manipulations in an audio signal to explain the output of the ADD model. If the ADDSegDiff model 350 produces similar outputs to SpecSegDiff and/or the ground truth annotations, then ADDSegDiff model 350 can show that the pre-trained ADD model (e.g., the classifier) actually utilized the annotated artifacts (e.g., as opposed to other features of the audio signal) to make the real vs. fake classification.

At each de-noising step t, an input segmentation map $X_t$ (which may be the random noise input $X_T$ or the output of the previous de-noising step), can be input into segmentation map image encoder 310 to obtain extracted segmentation map feature embeddings. Intermediate features 324 of the audio signal obtained from the pre-trained ADD model can be input into MLP projector 326, which can project the features to smaller dimensions (e.g., from 1024 to 320 dimensions). The output of the MLP projector 326 can be passed to the conditioning image encoder 316 to obtain extracted conditioning input feature embeddings, which can be summed with the extracted segmentation map feature embeddings. The sum can then pass to encoder-decoder architecture 318, which refines the sum to obtain an output segmentation map $X_{t-1}$, which can be used as the input for the next step. De-noising step t can occur T times, until the visual representation of manipulations in the audio signal $X_0$ 306 is obtained. T can be a hyperparameter selected after experimentation.

While FIGS. 3A and 3B show exemplary explainable ADD machine-learning models that comprise diffusion models, it should be understood that explainable ADD machine-learning models can comprise other types of neural network models, such as convolutional neural network-based models, that can be trained on the ground truth explanations (e.g., the difference in the time-frequency domain between a bona-fide audio signal and a spoofed audio signal, where both signals are aligned in speaker and content attributes, such that the difference highlights artifacts from the audio synthesizer that generated the spoofed audio signal).

Experiments

Qualitative and quantitative measures are used to evaluate the proposed methods. The former involves manually inspecting the generated visual representations of the manipulations in a spoofed audio signal (also referred to as heatmaps) from different methods and comparing them against a binary ground truth obtained, as described previously, by subtracting a bona fide time-frequency representation from a spoofed time-frequency representation. The quantitative measures assess the alignment between predicted heatmaps and the ground truth annotations using standard metrics from the image segmentation task: Generalized Dice (GDice), $F_1$-score, IoU, Boundary $F_1$ (FBound), and Structural Similarity Index Measure (SSIM). Since the diffusion generates attributions only for the spoof class, the evaluation is conducted on the fake subset of the data.

Classical model faithfulness metrics (e.g., Average Increase (AI ↑), Average Drop (AD ↓), Average Gain (AG ↑), and Input Fidelity (Fid-In ↑)) are computed to evaluate the change in an ADD model's confidence when the input is masked with a heatmap H. However, since H is sparse, the resulting masked audio, ISTFT (H·Ms, Ps), suffers severe distortion that impacts the decision of the ADD model. To circumvent this issue, the masked regions in magnitude and phase spectrograms can be replaced with their real counterparts. Therefore, the magnitude and phase inputs to ISTFT becomes H·Ms+(1−H)·Mb and H·Ps+(1−H)·Pb, respectively. If a particular region is not important for the model decision, its replacement with a bona fide counterpart should not significantly affect the prediction and vice versa. This means that the drop in the model score should happen only if H is indeed faithful and highlights the spoof artifact regions.

Experimental Setup

A VocV4 vocoded dataset was used to generate the supervised XAI dataset, which was then used to train SpecSegDiff and ADDSegDiff models, as well as compare them against classical XAI methods. Each real utterance in the dataset was resynthesized using four different vocoders applied on the genuine spectrograms. To verify that the methodology can be applied on different datasets, LibriSeVoc, down sampled to 16 kHz, was used as the second data source. In contrast to VocV4 which uses generative adversarial network (GAN), flow-based, and signal processing-based vocoders, the LibriSeVoc dataset consists of six different vocoders created using GAN, diffusion, and autoregressive approaches. In LibriSeVoc, fake audio signals were created using a resynthesis technique but with trimmed silences at the edges, which creates temporal misalignment between the real and fake audio signals. This was resolved by applying dynamic time warping to find border points, then using the border points shift the spoof audio signals and the real audio signals in the time domain to get aligned audio signals.

Experimental Setup for SpecSegDiff. SpecSegDiff was trained until convergence using an Adam optimizer with a constant learning rate of $10^{-4}$ and weight decay of $10^{-4}$ for around 100,000 steps. A global batch size of 24 was used in all these experiments.

Experimental Setup for ADDSegDiff. For ADDSegDiff experiments, Wav2Vec2-AASIST, a popular ADD model with state-of the-art performance, was used to extract the conditioning features. The Wav2Vec2-AASIST model is described in H. Tak, M. Todisco, X. Wang, J.-w. Jung, J. Yamagishi, and N. Evans, "Automatic speaker verification spoofing and deepfake detection using wav2vec 2.0 and data augmentation," in *The Speaker and Language Recognition Workshop (Odyssey* 2022), 2022, which is incorporated herein by reference in its entirety for all purposes. The training of the ADD model followed the original training methods for Wav2Vec2-AASIST, except for the difference in the training dataset, which was VocV4. The ADD model had an equal error rate (EER) of 1.17%, 1.40%, 2.75%, and 5.04% on VocV4 (development set), LibriSeVoc, ASVspoof 2019, and In-The-Wild datasets, respectively. Outputs of the {0, 4, 9, 14, 19, 23}-th transformer layers were taken from the frozen ADD model as the conditioning features for ADDSegDiff. The features were projected from 1024 to 320 dimensions using 2-layer multilayer perceptron (MLP) before passing them to ADDSegDiff. ADDSegDiff was trained for around 100,000 steps with a global batch size of 48. For all the experiments, RawBoost data augmentation was applied with 50% chance to improve the diffusion model's robustness to clean and noisy utterances. To ensure that augmented audio still differs only because of vocoder artifacts, fake and its parallel real audio were augmented with the same random noise-vector and hyperparameters. During inference, each diffusion model predicted 32 masks using different random noise samples and returned the average as a heatmap.

Experimental Setup for Classical XAI Techniques. DeepSHAP, GradientSHAP, and AttnLRP were also evaluated. RawWrapper was applied to obtain attributions in the time-frequency domain for the ADD model trained with raw waveform as input. State-of-the-art ADD models today operate on raw waveform inputs. To enable explanations in the time-frequency domain with classical XAI methods, Raw Wrapper was used, which prepends Inverse Short-Time Fourier Transform (ISTFT) as a convolutional layer at the start of the ADD model. For an ADD model f operating on raw waveform x, f(x)=f(ISTFT(STFT(x)))=f(ISTFT(M, P)), where M and P are the magnitude and phase spectrograms, respectively, obtained from x after applying a Short-Time Fourier Transform (STFT). By defining Raw Wrapper$_f$(M, P)=f(ISTFT(M, P)), a wrapped model was obtained that matches behavior of the ADD system but operates on input in the time-frequency domain. Simultaneously, classical XAI techniques, such as SHAP and LRP, can be applied directly in the time-frequency domain as M becomes the part of the computational graph, which allows propagating relevancy from the output to the input. RawWrapper relies on the exact replication of the f decision-making process, which can be achieved by properly choosing STFT parameters to facilitate perfect reconstruction of a signal via ISTFT. In practice, the log-magnitude spectrogram is operated on for better visualization and value range, and the exponential is taken before ISTFT.

For DeepSHAP, 20 random bona fide utterances were used for the reference value. The setup for GradientSHAP generates 20 examples per utterances using zero-vector baselines. AttnLRP requires defining γ hyperparameter for convolutional and linear layers outside of transformer. A hyperparameter search was done with γ∈{0, 0.1, 10}, and the one that is more aligned with the dataset annotations was chosen: 10 for 1D-convolution and 0.1 for other layers.

Results and Discussion

Figure 4A:
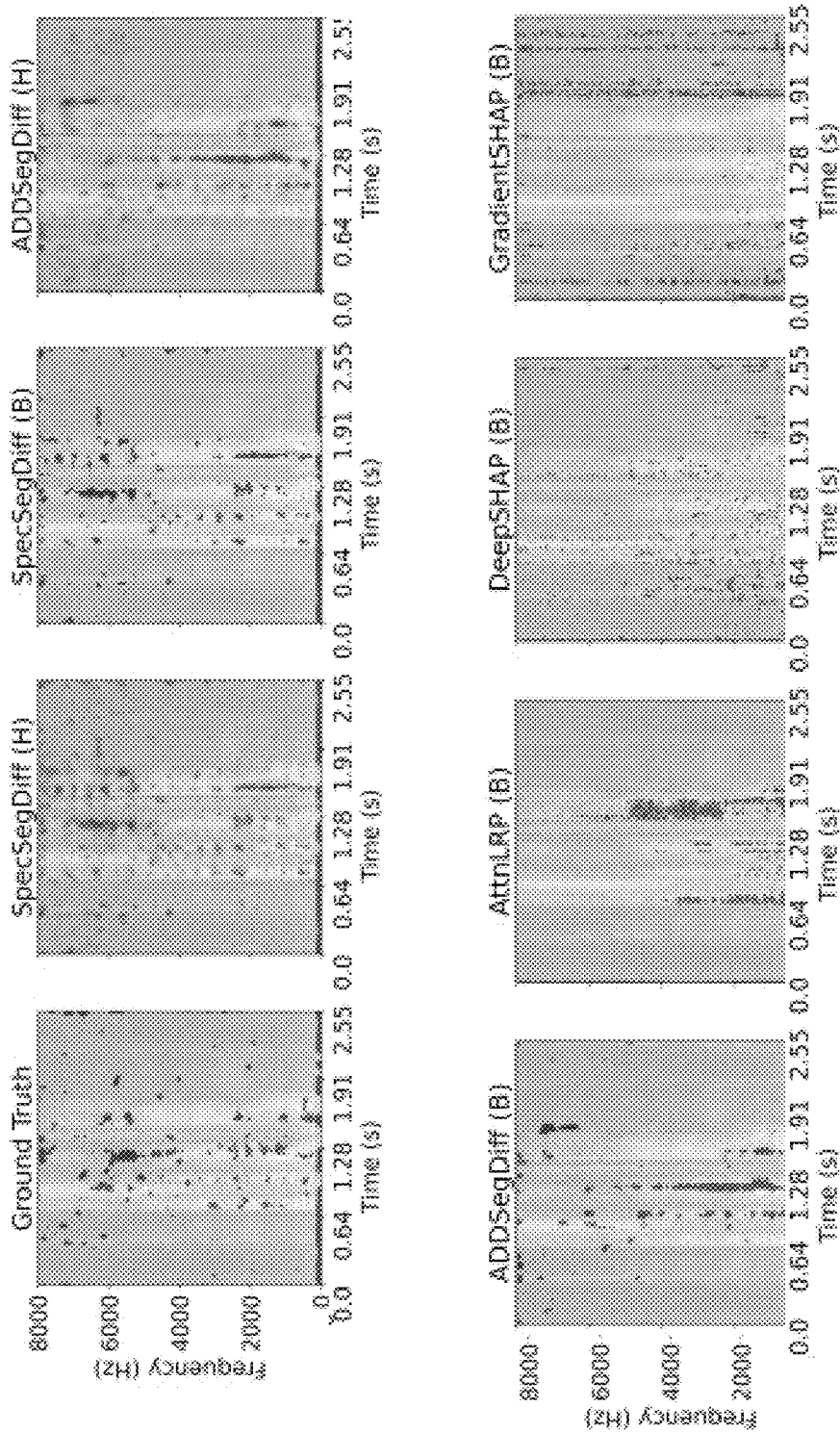
FIG. 4A provides exemplary experimental results of explainable artificial intelligence methods in generating visual representations of manipulations in a spoofed audio file generated by the Hn-NSF vocoder, in accordance with some embodiments.
Figure 4B:
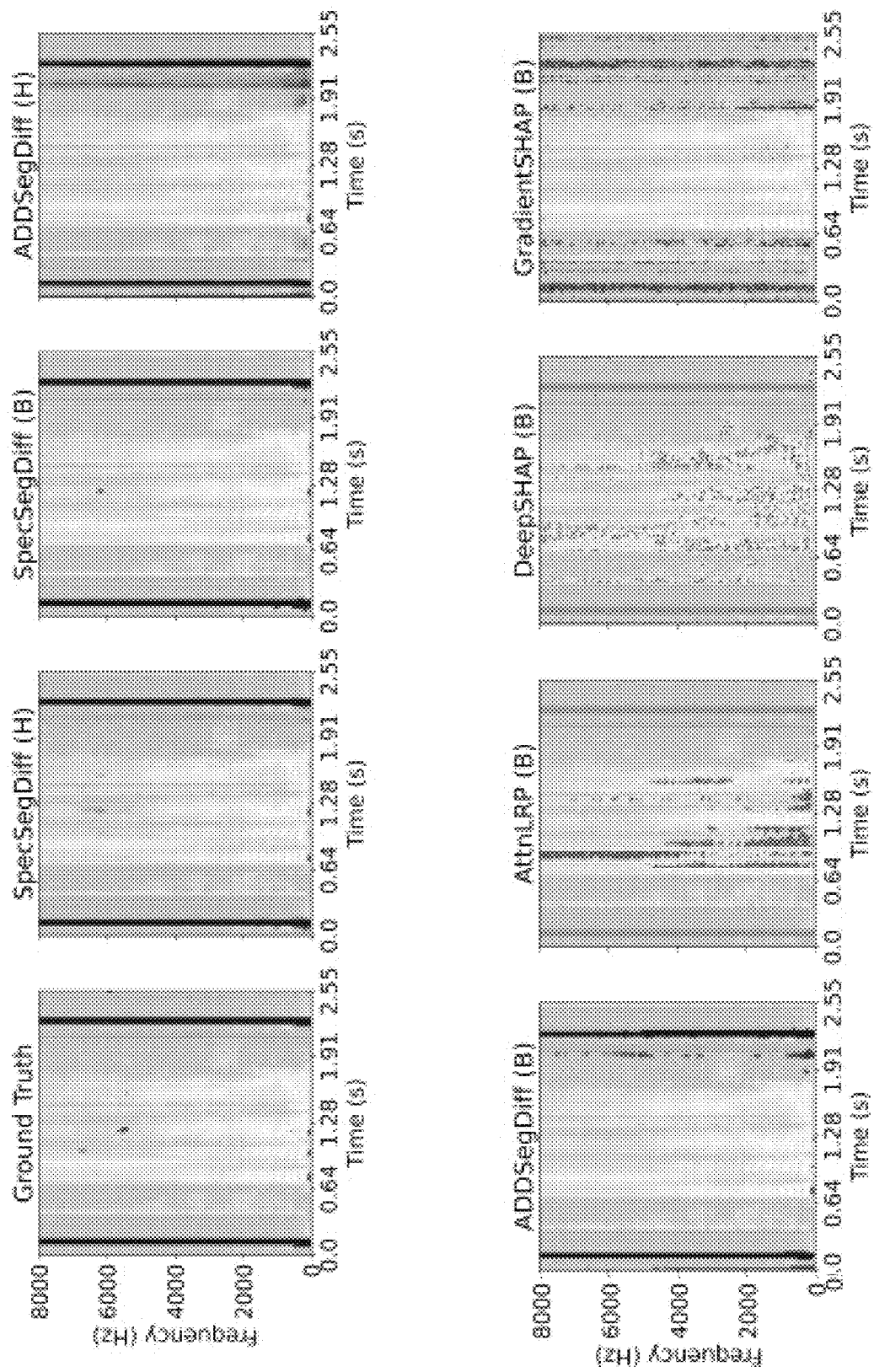
FIG. 4B provides exemplary qualitative experimental results of explainable artificial intelligence methods in generating visual representations of manipulations in a spoofed audio file generated by the WaveGlow vocoder, in accordance with some embodiments.

FIG. 4A and FIG. 4B show predictions from all the explainable AI methods on two vocoded audio signals from the VocV4 dataset. FIG. 4A and FIG. 4B show a comparison of the attributions from classic XAI tools, SpecSegDiff, and ADDSegDiff. Binarized (B) and heatmap (H) versions are shown for SpecSegDiff and ADDSegDiff. The binarization used a 95% quantile threshold. The utterances were re-synthesized from the same real audio but with different vocoders, with FIG. 4A showing the spoof audio signal generated by the Hn-NSF vocoder and FIG. 4B showing the spoof audio signal generated by the WaveGlow vocoder.

The ground truth spectrograms show that the artifacts introduced by these vocoders appear very distinct from each other. The first vocoder introduces artifacts in the low frequency bands across most of the timesteps as well as specific mid-frequency bands at particular timesteps corresponding to speech. However, the artifacts from the second vocoder appear to be independent of frequency bands and occur in non-speech regions at the start of audio. Looking at the predictions from classical XAI methods, all three classical methods fail to capture any detail in the ground truth for both utterances. Furthermore, their predictions for both audio are similar. Since both utterances are derived from the same real audio, these methods are simply highlighting characteristics of audio that, for example, may be related to content and not related to deepfake artifacts.

On the other hand, both SpecSegDiff and ADDSegDiff have different outputs for the two utterances. They also seem to be better aligned with the ground truth, which is not surprising, since the diffusion models were trained for this purpose. In addition, SpecSegDiff predictions are the most accurate as it correctly highlights the lower frequency band and has a lot of points in approximately the same frequency bands for the middle part of the first audio. For the second audio, its predictions exactly match the ground truth. Since the frequency bands are arranged contiguously and multiple frequencies are grouped in a single band, it should not be a problem if predictions match approximately with the ground truth. For ADDSegDiff, there is a similar pattern. The predictions are much better than the classical XAI methods and match the ground truth, however, less accurately than SpecSegDiff.

The methods were compared across entire datasets using quantitative metrics for the segmentation task, as well as faithfulness metrics. The results are shown in FIG. 5 on both VocV4 and LibriSeVoc datasets (separated by "/"). The versions of SpecSegDiff and ADDSegDiff evaluated on VocV4 and LibriSeVoc were trained on VocV4 and LibriSeVoc, respectively. Faithfulness metrics for SpecSegDiff were not reported since faithfulness metrics are computed for the pre-trained ADD model, whereas SpecSegDiff does not rely on any ADD model (e.g., because SpecSegDiff is classifier agnostic). Based on the table, there are at least three takeaways. Firstly, the numbers do not vary significantly across the two datasets for all the models and metrics, especially the segmentation metrics that measure the accuracy, as well as structural similarity between the prediction and ground truth. Secondly, there is a large gap between the metrics for classical XAI methods and diffusion-based methods. Finally, there is a smaller gap between SpecSegDiff and ADDSegDiff. The last two observations about the superior performance of diffusion-based methods match with the previous discussions based on the visual analysis of the predicted heatmaps. Moreover, the first observation suggests that the described methods can be trained on any detection dataset that contains vocoder artifacts. Therefore, the proposed methods lead to a superior XAI approach that is general enough to apply to any detection model and better aligned with ground truth explanations compared to existing techniques. The ground truth annotated regions are indeed used for the ADD model decision, since ADDSegDiff is able to overcome other methods in terms of faithfulness metrics and predict regions with high accuracy, while being conditioned only on the intermediate features.

Next, the performance gap between SpecSegDiff and ADDSegDiff models was addressed based on the above results in FIG. 4A, FIG. 4B, and FIG. 5. FIG. 4A and FIG. 4B show that ADDSegDiff misses a dense region (approximately in the middle of the ground truth) in FIG. 4A and predicts an extra column as shown in the continuous version of the heatmap in FIG. 4B. But the heatmaps predicted by SpecSegDiff are better, while SpecSegDiff also performs at least as good as ADDSegDiff on segmentation metrics. This could be due to the complex spatial relationship that ADDSegDiff needs to learn between latent space of the ADD model and time-frequency representation of the audio. The problem can be exacerbated due to the use of pretrained backbones in the ADD model. These backbones, such as Wav2Vec2, are trained as an encoder-only model. So, there is no objective that encourages the model to preserve all the spatial information. However, the mapping is straightforward in the case of SpecSegDiff as it operates on a magnitude spectrogram directly.

Figure 6:
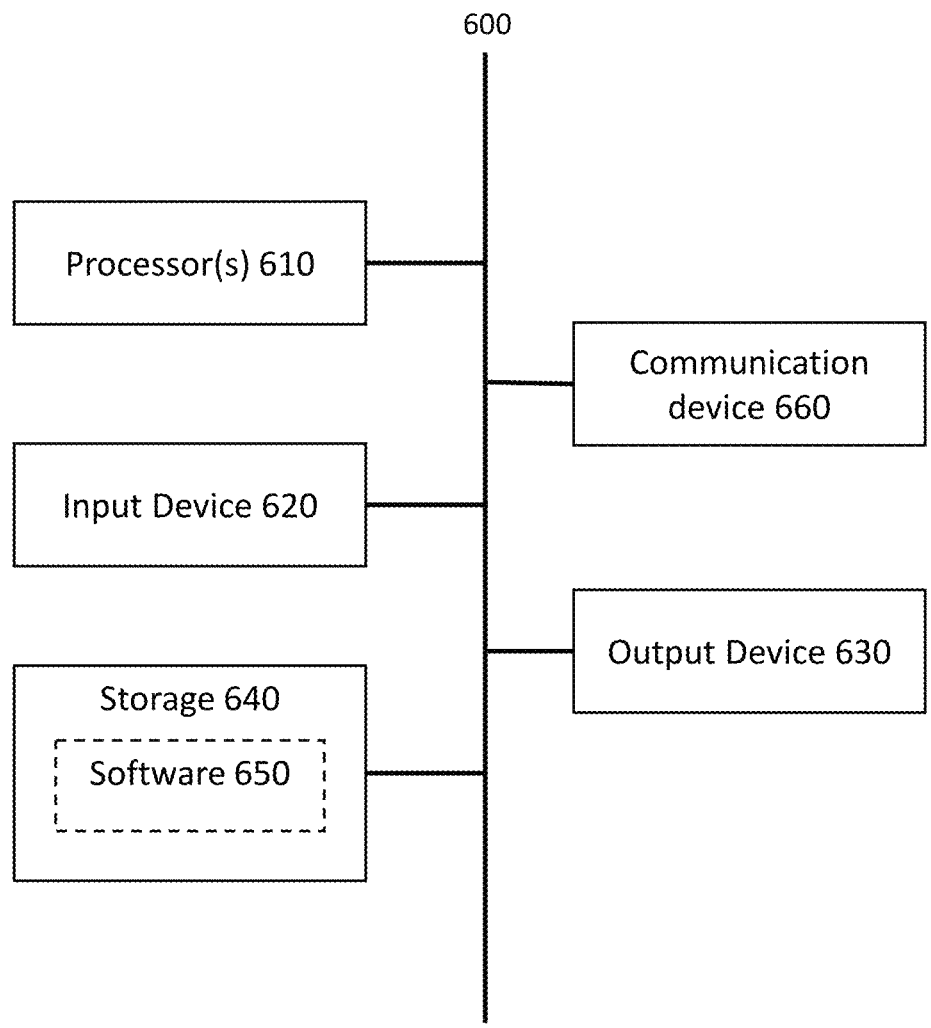
FIG. 6 illustrates an exemplary electronic device, in accordance with some embodiments.

FIG. 6 illustrates an example of a computing device in accordance with one embodiment. Device 600 can be a host computer connected to a network. Device 600 can be a client computer or a server. As shown in FIG. 6, device 600 can be any suitable type of microprocessor-based device, such as a personal computer, workstation, server or handheld computing device (portable electronic device) such as a phone or tablet. The device can include, for example, one or more of processor 610, input device 620, output device 630, storage 640, and communication device 660. Input device 620 and output device 630 can generally correspond to those described above, and can either be connectable or integrated with the computer.

Input device 620 can be any suitable device that provides input, such as a touch screen, keyboard or keypad, mouse, or voice-recognition device. Output device 630 can be any suitable device that provides output, such as a touch screen, haptics device, or speaker.

Storage 640 can be any suitable device that provides storage, such as an electrical, magnetic or optical memory including a RAM, cache, hard drive, or removable storage disk. Communication device 660 can include any suitable device capable of transmitting and receiving signals over a network, such as a network interface chip or device. The components of the computer can be connected in any suitable manner, such as via a physical bus or wirelessly.

Software 650, which can be stored in storage 640 and executed by processor 610, can include, for example, the programming that embodies the functionality of the present disclosure (e.g., as embodied in the devices as described above). Software 650 can also be stored and/or transported within any non-transitory computer readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 650 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific examples or aspects. However, the illustrative discussions above are not intended to be exhaustive or to limit the invention to the precise forms disclosed. For the purpose of clarity and a concise description, features are described herein as part of the same or separate variations; however, it will be appreciated that the scope of the disclosure includes variations having combinations of all or some of the features described. Many modifications and variations are possible in view of the above teachings. The variations were chosen and described in order to best explain the principles of the techniques and their practical applications. Others skilled in the art are thereby enabled to best utilize the techniques and various variations with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. A method for generating a visual representation of manipulations in an audio signal, comprising:
   inputting the audio signal into a trained machine-learning model, wherein the machine-learning model is trained by:
   generating, based on a training bona fide audio signal, a training bona fide time-frequency representation;
   generating, based on a training spoofed audio signal, a training spoofed time-frequency representation, wherein the training spoofed audio signal is a manipulated version of the training bona fide audio signal;
   generating a training visual representation of manipulations in the training spoofed audio signal based at least on a difference between the training bona fide time-frequency representation and the training spoofed time-frequency representation; and
   training the audio deepfake detection machine-learning model based on the training visual representation of the manipulations in the training spoofed audio signal; and
   generating, by the machine-learning model, the visual representation of the manipulations in the audio signal.

2. The method of claim 1, further comprising displaying the visual representation of the manipulations in the audio signal.

3. The method of claim 1, further comprising displaying one or more timestamps associated with the manipulations in the audio signal.

4. The method of claim 1, further comprising:
   inputting the visual representation of the manipulations in the audio signal into a language model; and
   generating, by the language model, a natural language description of the manipulations in the audio signal.

5. The method of claim 4, wherein the language model is trained based on the training visual representation of the manipulations in the training spoofed audio signal and a natural-language description of the manipulations in the training spoofed audio signal.

6. The method of claim 4, further comprising displaying the natural language description of the manipulations in the audio signal.

7. The method of claim 1, wherein the audio signal comprises a real-time signal from a telephone call.

8. The method of claim 7, further comprising automatically terminating the telephone call.

9. The method of claim 7, further comprising displaying a warning that the telephone call comprises manipulations.

10. The method of claim 7, further comprising outputting a recommendation to terminate the telephone call.

11. The method of claim 1, wherein the audio signal comprises a recorded voicemail message.

12. The method of claim 11, further comprising displaying a warning that the recorded voicemail message comprises manipulations.

13. The method of claim 1, wherein the training bona fide time-frequency representation and the training spoofed time-frequency representation are spectrograms.

14. The method of claim 1, wherein the training bona fide audio signal comprises one or more utterances by a speaker and the training spoofed audio signal comprises a manipulated version of the one or more utterances by the speaker.

15. The method of claim 1, wherein the training spoofed audio signal is generated by a deepfake machine-learning model based on the training bona fide audio signal.

16. The method of claim 1, wherein the training bona fide audio signal and the training spoofed audio signal are time synchronized.

17. The method of claim 1, wherein generating the training visual representation of the manipulations in the training spoofed audio signal further comprises:
- smoothing the training bona fide time-frequency representation; and
- smoothing the training spoofed time-frequency representation, wherein the difference between the training bona fide time-frequency representation and the training spoofed time-frequency representation is calculated by subtracting the smoothed training bona fide time-frequency representation from the smoothed training spoofed time-frequency representation.

18. The method of claim 1, wherein generating the training visual representation of the manipulations in the training spoofed audio signal further comprises normalizing the difference between the training bona fide time-frequency representation and the training spoofed time-frequency representation.

19. The method of claim 1, wherein the machine-learning model comprises a diffusion model.

20. The method of claim 1, wherein the machine-learning model comprises a convolutional neural network.

21. A system for generating a visual representation of manipulations in an audio signal, comprising: one or more processors; one or more memories; and one or more programs, wherein the one or more programs are stored in the one or more memories and configured to be executed by the one or more processors, the one or more programs including instructions for:
- inputting the audio signal into a trained machine-learning model, wherein the machine-learning model is trained by:
  - generating, based on a training bona fide audio signal, a training bona fide time-frequency representation;
  - generating, based on a training spoofed audio signal, a training spoofed time-frequency representation, wherein the training spoofed audio signal is a manipulated version of the training bona fide audio signal;
  - generating a training visual representation of manipulations in the training spoofed audio signal based at least on a difference between the training bona fide time-frequency representation and the training spoofed time-frequency representation; and
  - training the audio deepfake detection machine-learning model based on the training visual representation of the manipulations in the training spoofed audio signal; and
- generating, by the machine-learning model, the visual representation of the manipulations in the audio signal.

22. A non-transitory computer-readable storage medium storing one or more programs for generating a visual representation of manipulations in an audio signal, the one or more programs comprising instructions, which when executed by one or more processors of an electronic device, cause the electronic device to perform:
- inputting the audio signal into a trained machine-learning model, wherein the machine-learning model is trained by:
  - generating, based on a training bona fide audio signal, a training bona fide time-frequency representation;
  - generating, based on a training spoofed audio signal, a training spoofed time-frequency representation, wherein the training spoofed audio signal is a manipulated version of the training bona fide audio signal;
  - generating a training visual representation of manipulations in the training spoofed audio signal based at least on a difference between the training bona fide time-frequency representation and the training spoofed time-frequency representation; and
  - training the audio deepfake detection machine-learning model based on the training visual representation of the manipulations in the training spoofed audio signal; and
- generating, by the machine-learning model, the visual representation of the manipulations in the audio signal.

* * * * *